(12) United States Patent
Cacciola et al.

(10) Patent No.: US 6,231,012 B1
(45) Date of Patent: May 15, 2001

(54) NO-BACK/OFFSET GEAR BOX

(76) Inventors: Michael J. Cacciola; Mark J. Gardner; Stephen T. Steadman, all of The Boeing Company P.O. Box 3707, M/S 13-08, Seattle, WA (US) 98124-2207

( * ) Notice: Subject to any disclaimer, the term of this patent is extended or adjusted under 35 U.S.C. 154(b) by 0 days.

(21) Appl. No.: 09/180,778

(22) PCT Filed: May 14, 1996

(86) PCT No.: PCT/US97/08255

§ 371 Date: Nov. 12, 1997

§ 102(e) Date: Nov. 12, 1997

(87) PCT Pub. No.: WO97/43557

PCT Pub. Date: Nov. 20, 1997

Related U.S. Application Data

(60) Provisional application No. 60/017,923, filed on May 15, 1996.

(51) Int. Cl.[7] .............................. B64C 3/58; B64C 9/00; B64C 3/50; B64C 13/34; B64C 13/00
(52) U.S. Cl. ........................ 244/213; 244/214; 244/75 R; 244/231; 464/32; 403/2
(58) Field of Search ............................ 464/30, 32; 403/2; 74/411; 244/75 R, 213, 75 A, 231, 214

(56) References Cited

U.S. PATENT DOCUMENTS

| | | | |
|---|---|---|---|
| 2,892,329 | 6/1959 | Trigilio | 64/28 |
| 3,090,258 | 5/1963 | Zink et al. | 74/801 |
| 3,185,413 | 5/1965 | Walker | 244/63 |
| 3,321,988 | 5/1967 | Peras | 74/411 |
| 3,667,214 | 6/1972 | Addie | 60/13 |
| 4,411,546 | 10/1983 | Fischer | 403/23 |
| 4,669,999 | 6/1987 | Miller | 464/10 |
| 4,971,267 | 11/1990 | Fulton et al. | 244/75 R |
| 5,474,408 | 12/1995 | Dinitz et al. | 411/5 |
| 5,553,960 | 9/1996 | Turer et al. | 403/2 |

*Primary Examiner*—Charles T. Jordan
*Assistant Examiner*—Christian M. Best

(57) ABSTRACT

Referring to FIG. 2, disclosed is an aircraft compound no-back/offset gearbox (2) with an integral load proportional safety (no-back) brake (50). The four gears are all 16 diametral pitch, involute external spur gears with 20 degree standard pressure angles. The two gear stages are interconnected with a mechanical fuse or shearout (40) designed to fail under excess shear loads and protect components downstream of the input shaft (10) from excess torque in the event of a system jam. The shearout (40) is essentially a quill shaft with external splines at both ends and an hourglass-shaped shear neckdown in the middle. The purpose of the no-back brake (50) is to prevent air loads from causing slat movement in the event of a torque tube disconnect. Referring to Figure, the no-back consists of a set of ball ramp (22) and brake plate components connected to the gearbox's output shaft. The ball ramp device converts part of the back driving torque into the axial force required to clamp the brake stack components (30) and restrain the output shaft. In this way, the back driving torque is reacted to structure and movement of the slat is prevented.

3 Claims, 7 Drawing Sheets

Fig. 2 GEAR BOX SCHEMATIC

NO-BACK/OFFSET GEAR BOX

REFERENCE TO RELATED APPLICATIONS

This application relates to a U.S. Provisional Application No. 60/017,923 entitled "Leading Edge No-Back/Offset Gearbox" filed on May 15, 1996 by Michael J. Cacciola, Mark J. Gardner and Stephen T. Steadman.

FIELD OF THE INVENTION

The present invention relates to airplane wing high lift device such as leading edges slats/flaps and trailing edge flaps. More particularly, the invention relates to the high lift drive system gearboxes used to deploy leading edge slats/flaps and trailing edge flaps.

BACKGROUND OF THE INVENTION

The mechanical power for deploying high lift devices in many commercial airplanes today involves very high speed rotational torque. Such torque is generated by a power drive unit, or system power source, and transmitted via torque tubes forming a driveline along the wing to the most outboard rotary actuator to be powered. These rotary actuators are actually gear speed reducers that reduce the rotational speed from about 700–1000 rpm to about 1–10 rpm. This increases the available torque correspondingly so that the high lift devices may be deployed with appropriate force and speed of deployment, even under adverse conditions such as ice buildup on the wing leading edge.

In some commercial airplanes, it has been possible to place the drivelines such that they align with the rotary actuator. In other airplanes, this has not been possible, and it has been necessary to utilize an "offset" gearbox to transmit the rotary power from the centerline of the driveline, forwardly to the centerline of the rotary actuator. Hence, the term "offset gearbox" has been applied to the gearbox of this invention.

A problem in this type of offset gearbox is that, due in part to its complexity, and because aircraft safety is a concern, it can be costly and time consuming to perform inspections on and to perform required maintenance activities.

SUMMARY OF THE INVENTION

One aspect of the present invention provides for an improvement in deployment of a high lift device comprising a non-back brake system for use in controlling back driven loads.

Another aspect of the present invention relates to an improved no-back offset gearbox and an improved shearout or mechanical fuse to prevent damage to other components under excessive torque loads, said shearout comprising a dedicated dog bone shaft that will avoid the nuisance shearout failures of the prior art. Said shearout additionally having a closely toleranced shear neck designed to rupture within a 20% scatter band. The shear essentially uses a quill shaft with external splines at both ends and an hourglass-shaped neck in the middle.

Still another aspect of the present invention relates to the assembly of the first stage gear and second stage pinion in that they are in a unique nesting arrangement and interconnected with the shearout. The design allows the gears to share the same bearings but remain independent and capable of rotating with respect to one another in the event of a shearout failure.

Also, the shearout extraction components are integrated into the design of the gearbox and provide a built-in capability for removing broken shearout pieces without removing or disassembly of the gearbox.

DETAILED DESCRIPTION OF THE PREFERRED EMBODIMENT

The gearbox of this invention is used in the leading edge high lift systems which extend and retract the wing's leading edge slats. It is an oil-lubricated, two-stage, compound offset gearbox with an integral shearout and load-proportional, safety brake. The shearout interconnects the two gear stages and acts as a mechanical fuse to protect components downstream of the input shaft from excess torque in the event of a system jam. The safety brake (also known as a "no-back" brake) prevents air loads from causing leading edge slat movement if there is a disconnect of the drive shaft connecting the gearbox to the system's power source.

Figure 1:
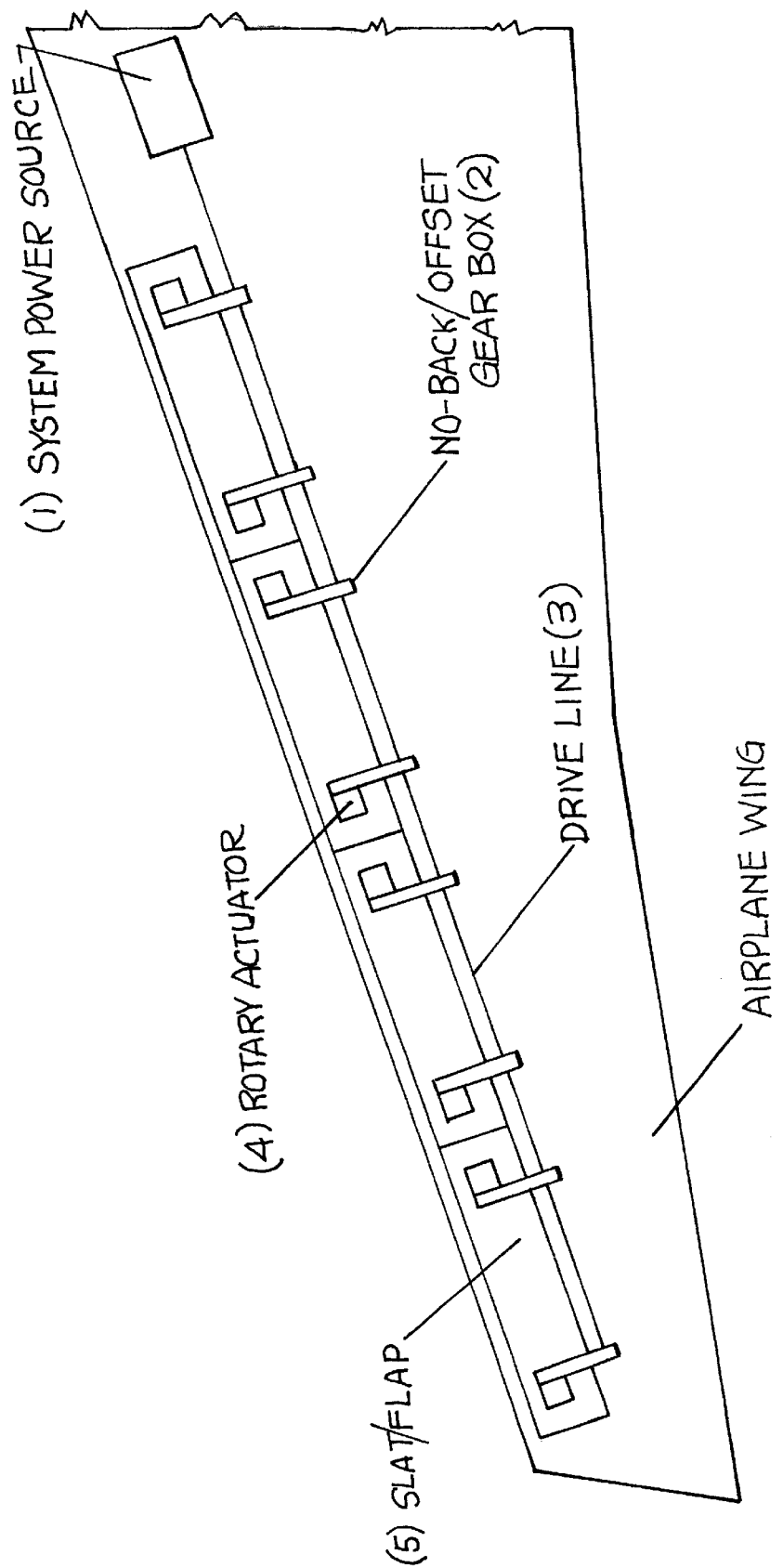
FIG. 1 is a schematic representation of one half an aircraft wing equipped with a power drive unit for deploying leading edge slats.

FIG. 1 is a schematic representation of one-half of an aircraft wing equipped with a power drive unit for deploying leading edge slats on that side of the aircraft. Referring to FIG. 1, a schematic plan view of the outboard section of an aircraft wing is shown. The system power source, or power drive unit (1) is shown connected to a torque tube driveline (3). The driveline is segmented, in that torque tube segments are attached at each end to fittings at each gearbox (2). The torque developed at the power drive unit (1). The functions of each offset gear (2) include transmission of torque from the driveline forwardly to each of the rotary actuators (4).

Figure 2:
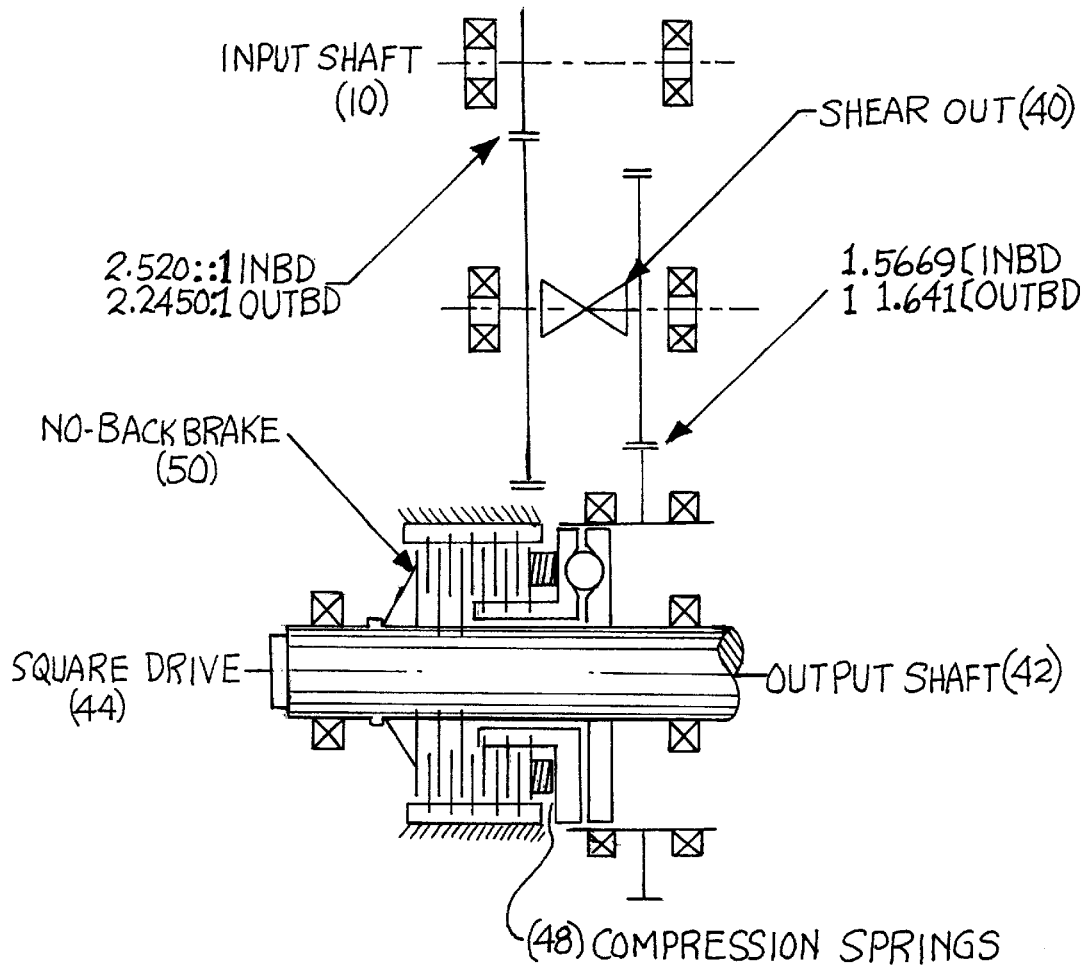
FIG. 2 is an overall schematic representation of the shearout, no-back, and input and output features of the gearbox of this invention.

FIG. 2 is an overall schematic representation and location of the shearout, no-back and input and output features of the gearbox of this invention. This gearbox schematic shows an input shaft (10), a shearout (40), an output shaft (24), with a square drive (44), a no-back brake (50), and compression springs (48).

High lift drive systems are designed to distribute shaft horsepower along the leading or trailing edge of the wing to torsional speed reducing gearboxes located at each leading edge slat/flap and trailing edge flap. The speed reducing gearboxes amplify torque from the drive system power source to deploy and stow the high lift surface through linkage or other structural connections. The primary purpose of the gearbox described in this invention is to divert a portion of the shaft horsepower being transmitted in the system driveline to each of the rotary actuators that directly deploy and stow the leading edge slats.

The no-back brake must be periodically checked to ensure that it is functioning properly. In addition, the shearout must be replaced when it has fractured due to a torque overload from the system power source. The inability to access the no-back brake and the shearout for these purposes while the gearbox is installed on the airplane (hereinafter in situ) can result in an increase in the maintenance time required to complete the tasks. A prior art gearbox of this type would have to be removed from the airplane and at least partially disassembled to perform a no-back brake check or a shearout replacement. Novel features of this invention facilitate the completion of these airplane maintenance activities in situ, eliminating the maintenance time associated with removing, disassembling, reassembling, and reinstalling the gearbox.

Figure 3:
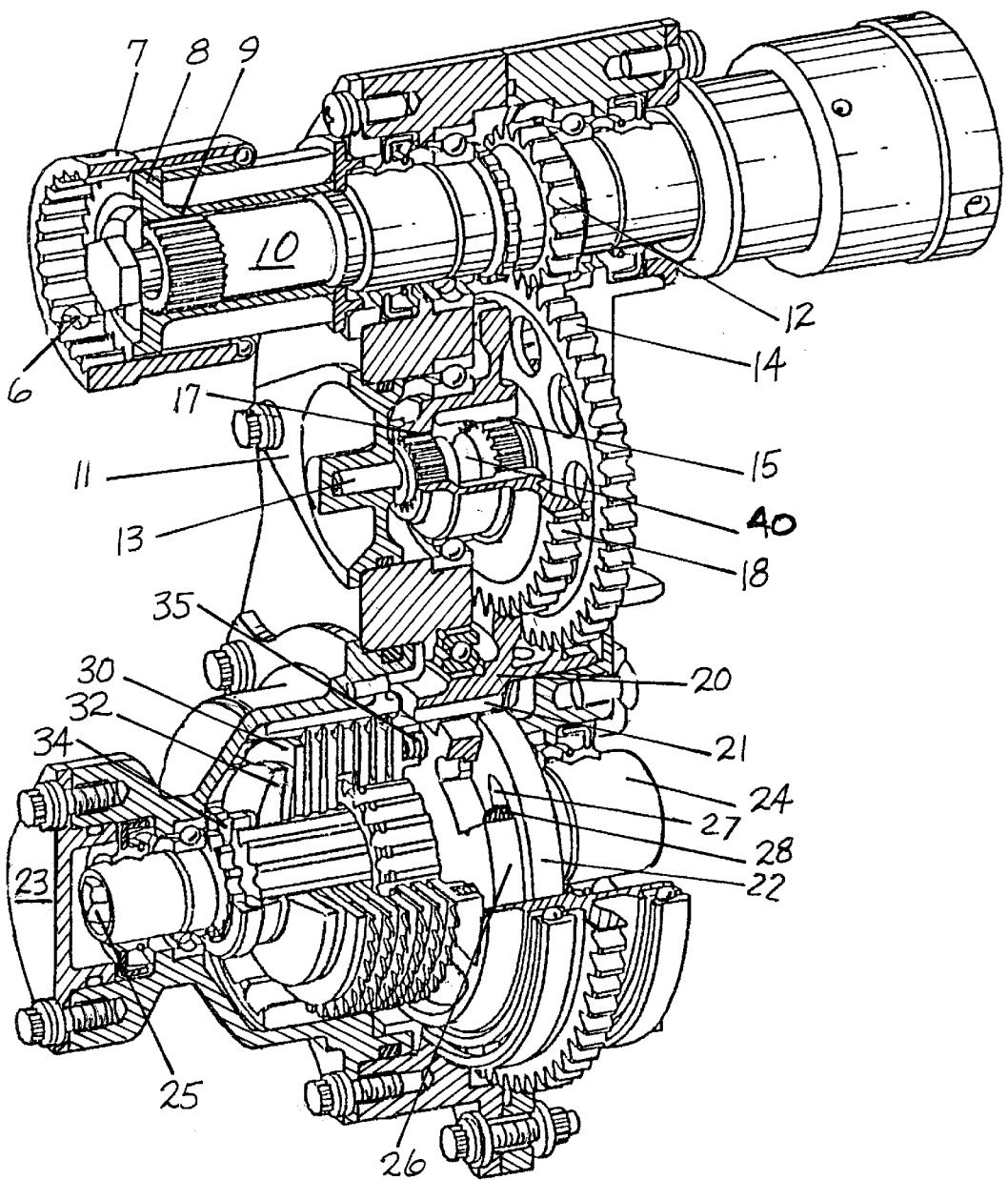
FIG. 3 is an isometric drawing of the gearbox of this invention, mostly in section

Referring now to FIG. 3, input shaft (10) is connected to coupling half (8) via involute spline (9). Coupling half (8) is spline engaged with coupling sleeve (7). Coupling sleeve (7), in turn, engages with a mating spline on the torque tube end fitting (not shown) and is axially secured with 3 screws through radial holes (6). Output shaft (24) is spline engaged with the input shaft of a rotary actuator (not shown).

First stage pinion (12), an integral part of input shaft (10), mates with first stage gear (14). First stage gear (14) engages with shearout (40) via involute spline (15). The opposite end of shearout (40) engages with second stage pinion (18) via involute spline (17). Second stage pinion (18), in turn, mates with second stage gear (20). Second stage gear (20) engages ball ramp plate (22) and reaction plate (26) via three "dogs" (21) spaced 120 degrees apart which act through three mating slots on both ball ramp plate (22) and reaction plate (26). Ball ramp plate (22) is spline engaged to output shaft (24).

Back driving loads acting on output shaft (24) are reacted through no-back brake stack (30) as follows. Rotation of ball ramp plate (22) due to back driving load cause three balls (28) spaced 120 degree apart to roll up ramps of three mating ball pockets (27) cut into opposing faces of ball ramp plate (22) and reaction plate (26). Reaction plate (26) is retrained from rotation by a brake preload induced by springs (35). This restraint torque causes reaction plate (26) to translate axially along output shaft (24) in a direction towards square drive (25). This axial motion compresses brake stack (30) between reaction plate (26) and stop (34). Rotation of output shaft (24) due to back driving load is arrested via a portion of brake stack (30) which is spline engaged with output shaft (24). Removal of back driving load allows Belleville spring (32) to reset the no-back brake by forcing reaction plate (26) to move axially in a direction away from square drive (25) causing balls (28) to roll back down ball ramps (27).

Shearout (40) is replaced by removing cover plate (11) and pulling on the exposed end of shearout extractor (13).

The no-back brake is checked for proper operation by removing cover plate (23) and inserting a torque wrench into square drive (25) cut into the end of output shaft (24). The no-back brake is then checked by applying a specified torque with a torque wrench.

The No-Back/Offset gearbox uses a dedicated, "dogbone" shaft, shearout to avoid the nuisance shearout failures encountered in prior art offset gearboxes. One offset gearbox used a simple pin in double shear to assemble the input shaft of the gearbox and act as shearout protection for the device. The shearout used in this invention has been carefully configured and has a closely toleranced shear neck designed to rupture within a 20 percent scatter band.

The first stage gear and second stage pinion of the No-Back/Offset gearbox are assembled in a unique, nested arrangement and interconnected with the shearout. This design allows the gears to share the same bearings but remain independent and capable of rotating with respect to one another in the event of a shearout failure.

The shearout extraction components are integrated into the design of the gearbox and provide a built-in capability for removing a broken shearout without removal or disassembly of the gearbox.

The load proportional safety brake (not-back brake) was integrated into the No-Back/Offset gearbox so that it can be checked for proper operation without removal or disassembly of the gearbox. An access coverplate and a square drive were added to the gearbox output shaft to allow this in situ inspection.

Figure 4:
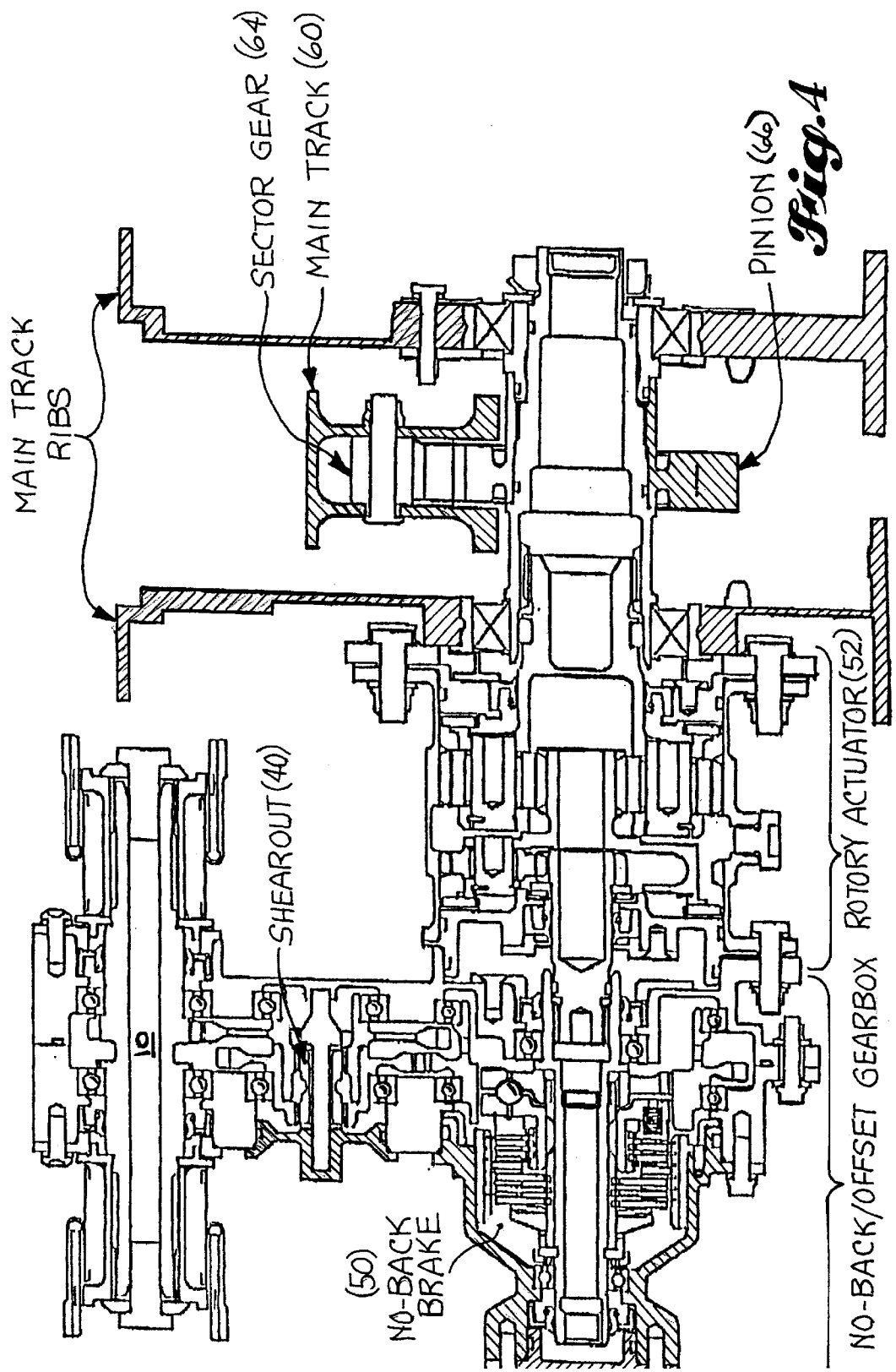
FIG. 4 is a cross-section showing of the gearbox of the invention, with its no-back and shearout features, attached to a rotary actuator and a rack and pinion drive means for deploying an aircraft slat section.

FIG. 4 shows a no-back offset gearbox, having a no-back brake (50), a shearout (40), the rotary actuator (52), a main track (60), a sector gear (64), and a pinion (66) that rotates around the output shaft (42) to drive the track (60) in either rotational direction in deploying the high lift device.

Figure 5:
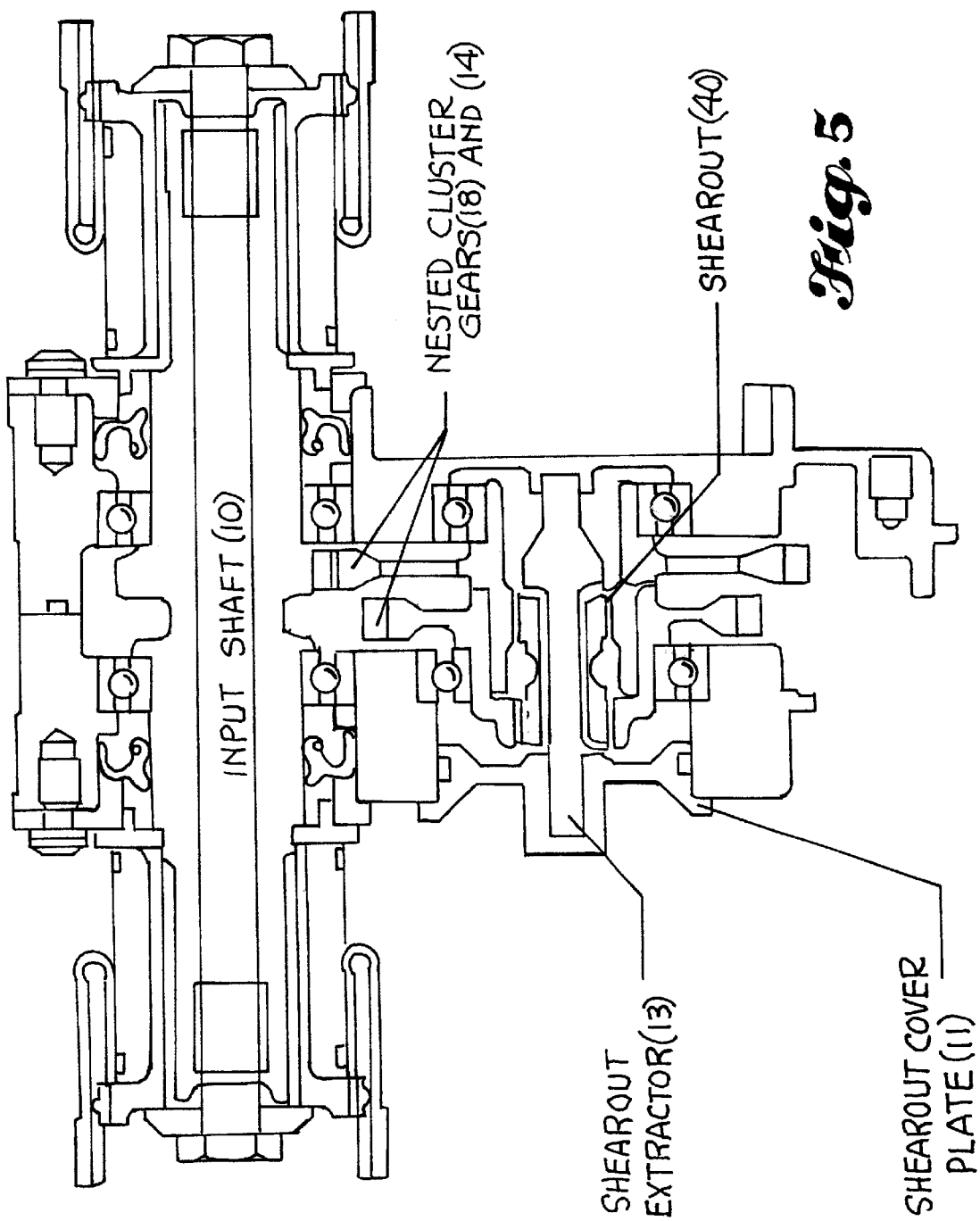
FIG. 5 is a cross-sectional view showing the shearout assembly of parts just below the input shaft.

FIG. 5 is a partial cross-section and cut away view showing the shearout cover plate (11), the shearout extractor (13), the input shaft (10), nested cluster gears (18) and (14), and the shearout (40). The shearout cover plate (11) may be easily removed for inspection of the shearout (40). After the cover plate (11) is removed, the condition of the shearout (40) may be inspected. As mentioned before, the shearout (40) is made of steel and surrounds the extractor (13).

Figure 6:
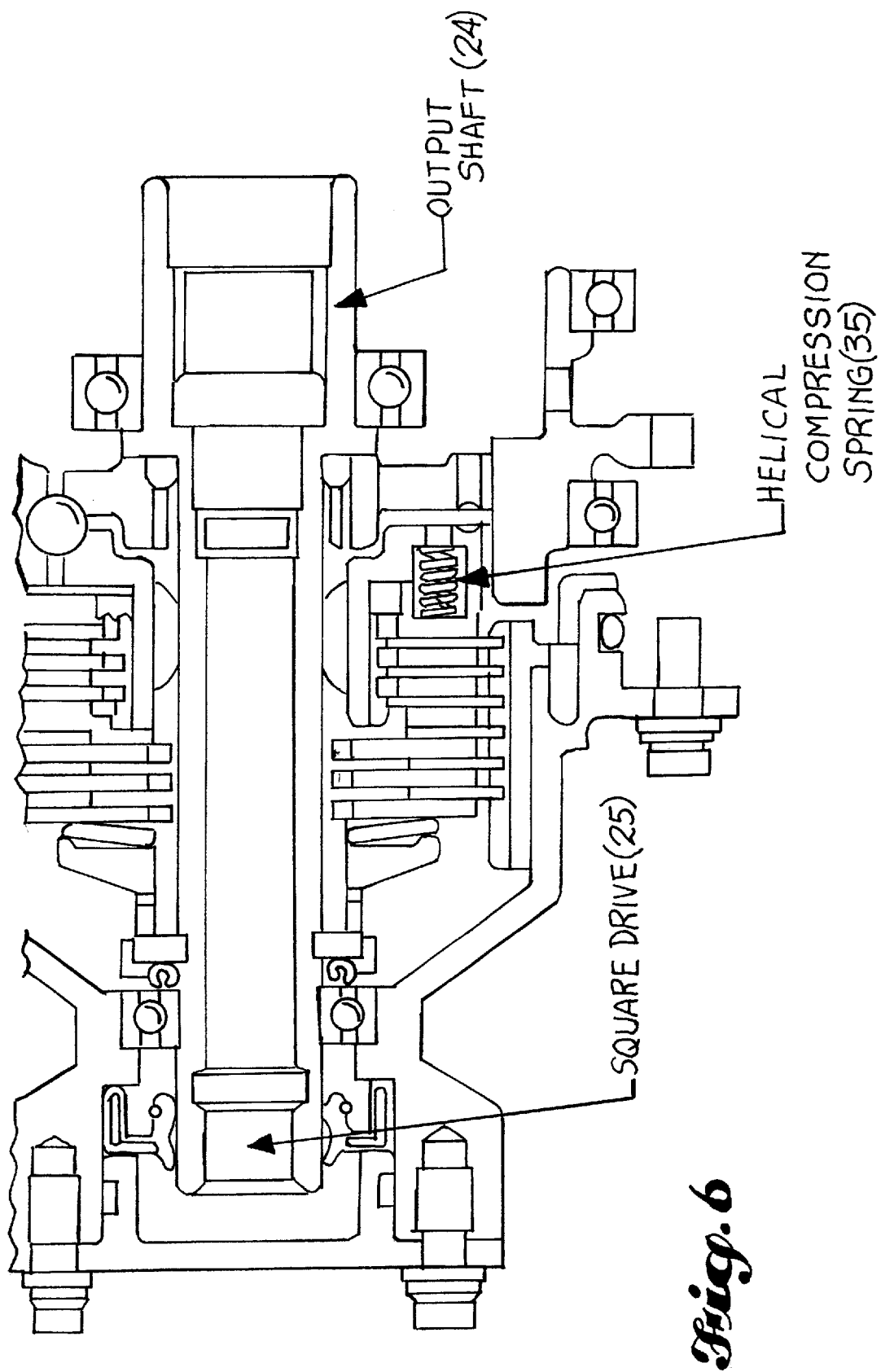
FIG. 6 is a cross-sectional view showing the no-back assembly of parts near the output shaft.

FIG. 6 is a partial cross-section showing the no-back brake. The helical compression springs (35) cause the reaction plate (26) to be restrained from motion by a brake preload to be induced by springs (35). This type of restraint is helpful to prevent inadvertent motion between pairs in a torsional system.

While preferred embodiments of the invention have been illustrated and described, it will be appreciated that various changes may be made herein without departing from the spirit and scope of the invention.

Figure 8:
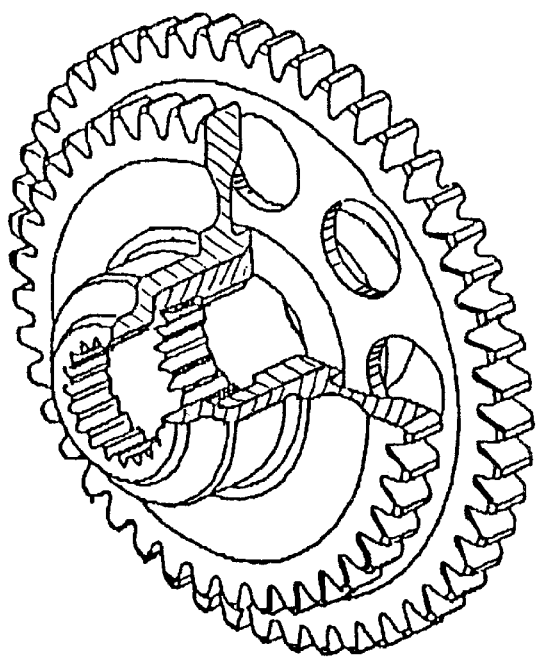
FIG. 8 is an isometric view of cluster gears nested together.
Figure 7:
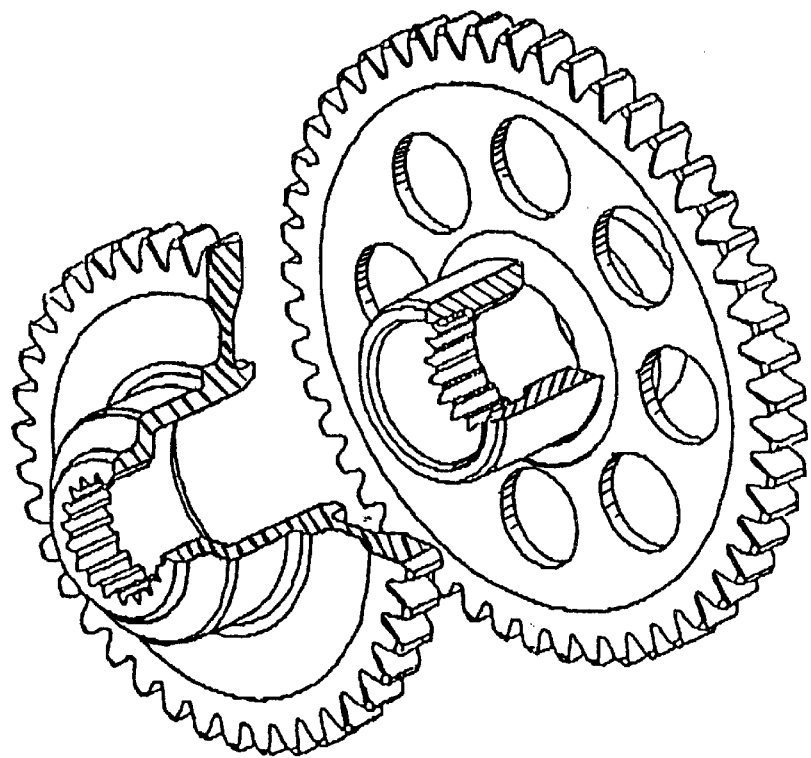
FIG. 7 is an isometric exploded view of cluster gears of this invention.

What is claimed is:

1. An improvement in an aircraft no-back/offset gearbox having two gear stages (14) and (18) assembled in a unique, nested arrangement and interconnected with a shearout (40); said arrangement allowing the gears to share bearings but remain torsionally independent and capable of rotating with respect to one another in the event of shearout failure; one gear machined with an inner diameter capable of accepting a mating, outer diameter machined on the other gear as shown in FIGS. 7 and 8, such that a close tolerance slip fit results; said improvement having a built-in capability for removing said shearout without removal of the gearbox from the aircraft and without disassembly of the gearbox; said capability arising from an extractor (13) positioned within the bore of the shearout (40) as shown in FIG. 5; said extractor consisting of an aluminum shaft with a shoulder at one end having an outside diameter greater than the inside diameter of the shearout; said extractor being integrated into the design of the gearbox by being piloted at one end by a bore in the gearbox housing and at the other by a bore provided in the shearout cover plate (11), an improvement in an aircraft offset gearbox having a load proportional safety brake (no-back brake); said no-back brake being integrated into the gearbox such that it can be checked for proper operation without removal of the gearbox from the aircraft and without disassembly of the gearbox; said check being made possible by a female square drive (25) provided at one end of the gearbox output shaft, exposed with the removal of access coverplate (23).

2. The gearbox of claim 1 wherein the shearout is removable without removal of the gearbox from the aircraft and without disassembly of the gearbox because the extractor is positioned within a bore passing through the shearout, the extractor having a shoulder having a diameter larger than the diameter of the bore and being piloted in a first seat in a gearbox housing and a second seat in a shearout cover plate.

3. The gearbox of claim 1 wherein the output shaft includes a drive to allow checking proper operation of the no-back brake to test its load proportional safety.

* * * * *